(No Model.) 4 Sheets—Sheet 1.
R. H. RICE.
CUT-OFF VALVE GEAR.

No. 473,085. Patented Apr. 19, 1892.

Witnesses.
Walter E. Lombard
J. Clifford Entwisle

Inventor:
Richard H. Rice,
by N. C. Lombard
Attorney.

(No Model.)　　　　　　　　　　　　　　　　　　　　　4 Sheets—Sheet 2.
R. H. RICE.
CUT-OFF VALVE GEAR.

No. 473,085.　　　　　　　　　　　　　　Patented Apr. 19, 1892.

Witnesses:
Walter E. Lombard.
J. Clifford Entwisle

Inventor:
Richard H. Rice,
by N. C. Lombard
Attorney.

(No Model.) 4 Sheets—Sheet 3.

R. H. RICE.
CUT-OFF VALVE GEAR.

No. 473,085. Patented Apr. 19, 1892.

Witnesses:
Walter E. Lombard.
J. Clifford Entwisle

Inventor:
Richard H. Rice,
by N. C. Lombard
Attorney.

(No Model.) 4 Sheets—Sheet 4.
R. H. RICE.
CUT-OFF VALVE GEAR.

No. 473,085. Patented Apr. 19, 1892.

Witnesses:
Walter O. Lombard.
Robert B. Edis

Inventor:
Richard H. Rice,
by N. C. Lombard
Attorney.

UNITED STATES PATENT OFFICE.

RICHARD H. RICE, OF PROVIDENCE, RHODE ISLAND.

CUT-OFF-VALVE GEAR.

SPECIFICATION forming part of Letters Patent No. 473,085, dated April 19, 1892.

Application filed July 15, 1891. Serial No. 399,591. (No model.)

*To all whom it may concern:*

Be it known that I, RICHARD H. RICE, of Providence, in the county of Providence and State of Rhode Island, have invented certain new and useful Improvements in Cut-Off-Valve Gears for Steam-Engines, of which the following, taken in connection with the accompanying drawings, is a specification.

My invention relates to cut-off-valve gears for steam-engines of the Corliss type; and it consists in certain novel features of construction, arrangement, and combination of parts, which will be readily understood by reference to the description of the drawings and to the claims hereinafter given, and in which my invention is clearly pointed out.

Figure 1:
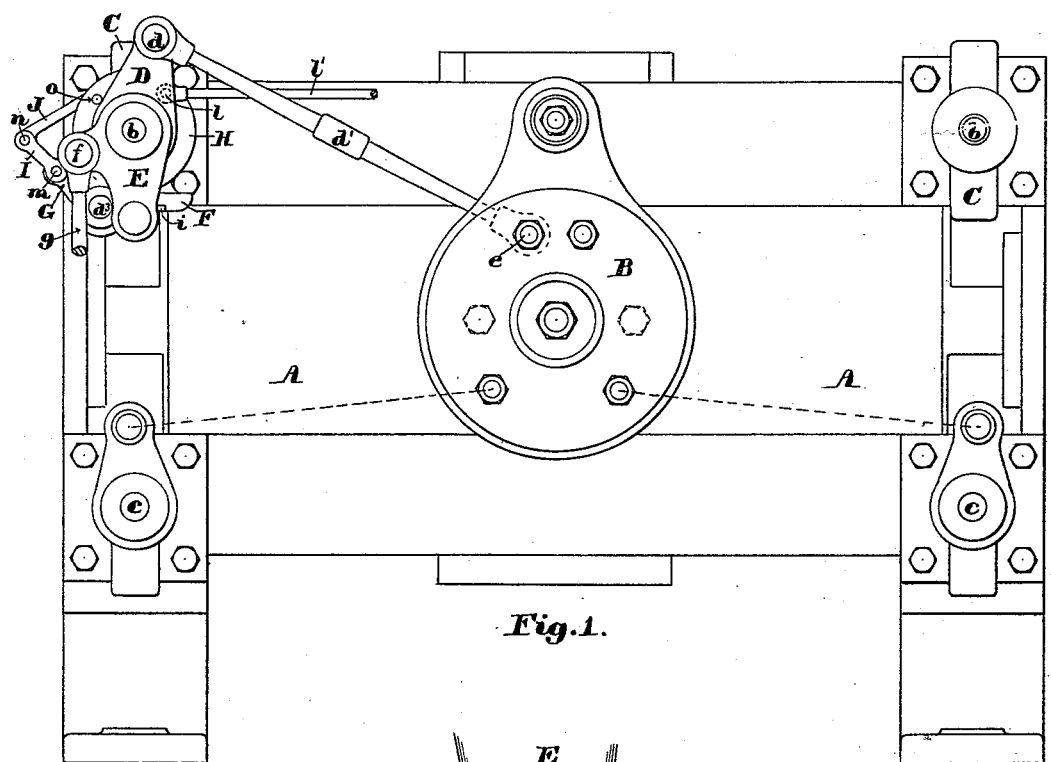
Figures 4, 7, 8:
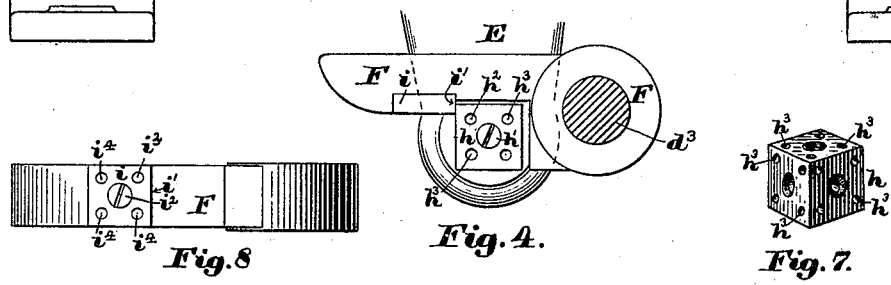
Figure 6:
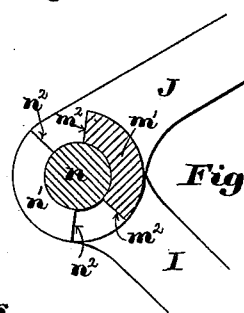
Figure 5:
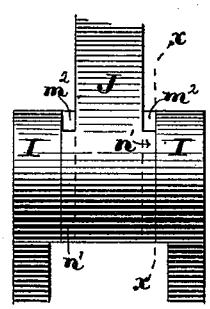
Figure 2:
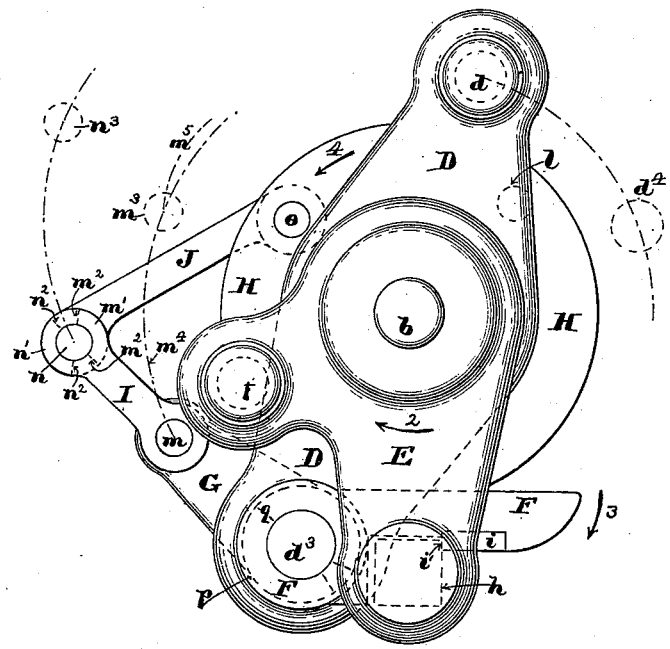
Figure 3:
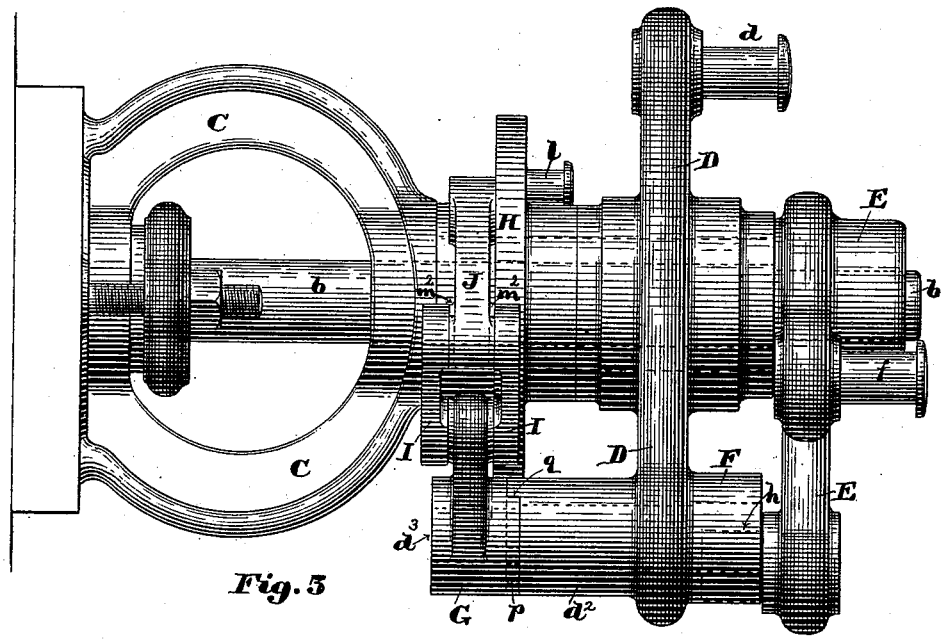
Figure 10:
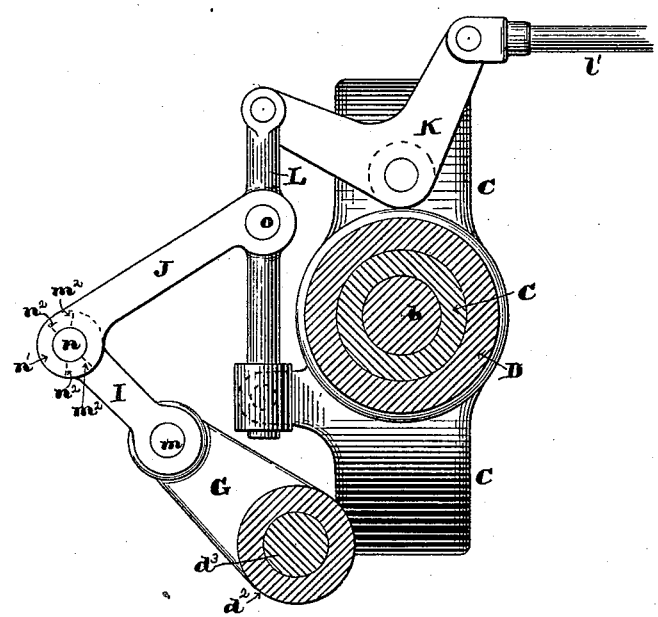
Figure 9:
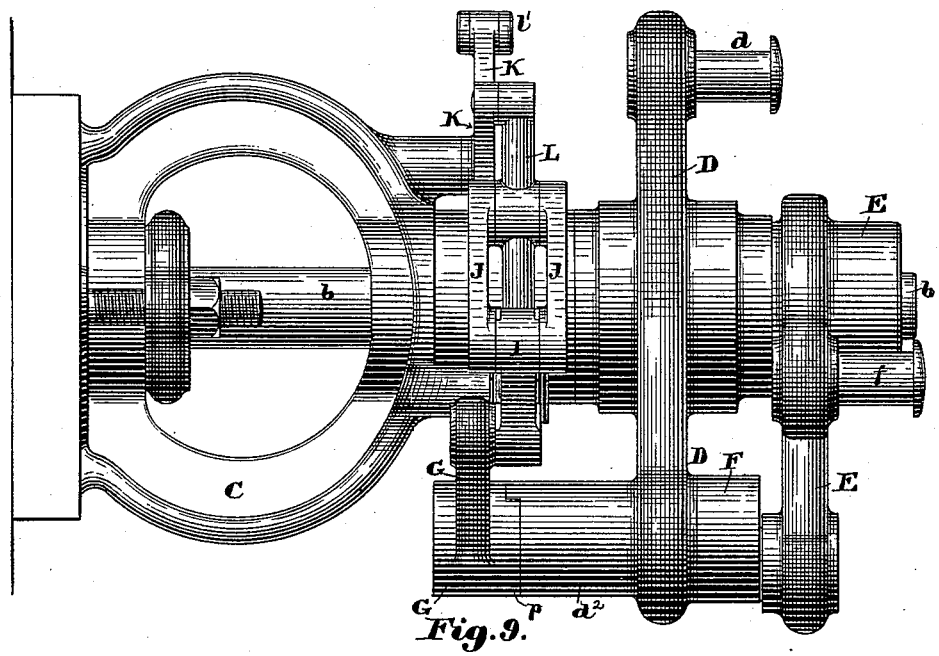
Figures 11, 12:
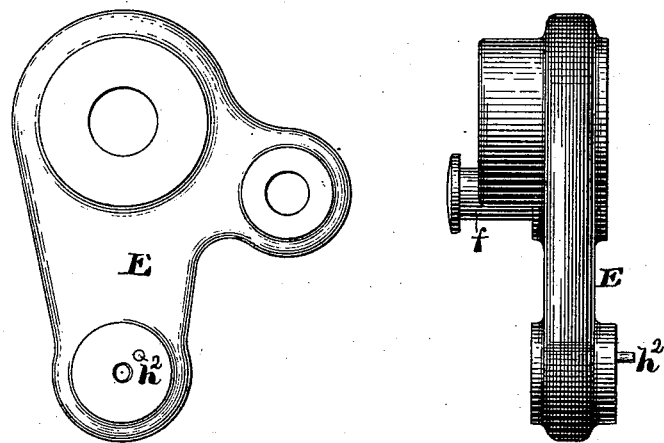
Figure 13:
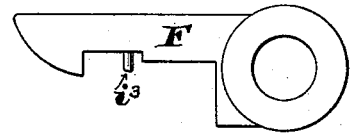
Figure 14:
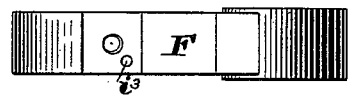

Figure 1 of the drawings is a side elevation of a steam-cylinder with my improved valve-gear applied to one of the steam-valves, this being considered sufficient to illustrate my invention. Fig. 2 is an elevation of the valve-gear looking at the end of the valve-stem. Fig. 3 is an elevation of the same part viewed in a direction at right angles to Fig. 2. Fig. 4 is an inside elevation of a portion of the valve-actuating lever, its block, and the hook for engaging the same. Fig. 5 is a partial edge view of the links I and J; and Fig. 6 is a sectional elevation of the same, the cutting-plane being on line $x$ $x$ on Fig. 5. Fig. 7 is a perspective view of block $h$. Fig. 8 is an inverted plan of the hook F. Figs. 9 and 10 illustrate a modification. Figs. 11 and 12 are respectively an elevation and an edge view of the block-carrying lever E with block detached, and Figs. 13 and 14 are respectively an elevation and an inverted plan of the hook F with plate $i$ removed.

In the drawings, A is the steam-cylinder.

B is the wrist-plate mounted upon a journal at the center of the cylinder in the usual manner.

$b$ $b$ are the steam-valve stems having bearings in the bonnets C C, and $c$ $c$ are the exhaust-valve stems, all constructed and arranged in a well-known manner.

D is the steam-lever mounted loosely upon the sleeve-like prolongation of the bonnet C and provided at its upper end with the wrist-pin $d$ to receive one end of the link $d'$, the opposite end of which is connected by the pin $e$ to the wrist-plate B, as shown in Fig. 1.

E is the valve-actuating lever, firmly secured to the valve-stem $b$ and provided with a wrist-pin $f$ to receive the upper end of the dash-pot rod $g$, by which the valve is closed when the valve-lever E is released from connection with the steam-lever D. The valve-lever E is also provided with a rectangular pin or block $h$, which projects inwardly from the lower end of its other arm, as shown in dotted lines in Figs. 2 and 3 and in full lines in Fig. 4.

The lower end of the steam-lever D is provided with the long hub $d^2$, in which is fitted so as to be revoluble therein the short shaft $d^3$, which has firmly secured upon its outer end the hook F, having set therein the hardened-steel plate $i$, the edge $i'$ of which forms a shoulder to engage the block $h$, as shown in Figs. 2 and 4. The shaft $d^3$ also has firmly secured on its inner end the arm or lever G.

H is the cut-off-controlling collar, connected by the pin $l$ and the link $l'$ to the governor and by the links I and J and pins $m$, $n$, and $o$ to the end of the lever G, as shown in Figs. 1 and 2. The hubs of the links I I have projections $m'$ on their inner faces, which form radial shoulders $m^2$, which are opposed to shoulders $n^2$ on the projections $n'$ on the contiguous hub of the link J, which shoulders $m^2$ and $n^2$ serve as stops to limit the movements of said links about the pin $n$, as shown in Figs. 5 and 6.

The hub of the lever G has a projection $p$, which co-operates with a similar projection on the inner end of the hub on the lower end of the steam-lever D, which projections form shoulders or stops to limit the movement of the lever G about the axis of the shaft $d^3$, as shown in dotted lines in Fig. 2 and in full lines in Fig. 3. Other forms of stops may be used to limit these movements instead of the hub projections shown, if desired, without departing from the principles of my invention.

The operation of my invention is as follows: The several parts of the valve-gear being in the positions shown in the drawings, and the cut-off collar being held in the position it occupies by the governor, and the wrist-plate B being moved about its axis of motion, so as to move the pin $d$ in the steam-lever from $d$ to $d^4$, the pin $m$ will move to $m^3$ along the curved dotted line $m^4$, which is concentric with the center of the valve-stem $b$, and the valve-lever E will be moved by the hook F in the direction indicated by the arrow 2, and the valve will be opened, and at the same time the link J will be moved about the pin $o$ until the pin $n$ is moved to $n^3$. When the pin $m$ and $n$ have assumed the positions indicated by $m^3$ and $n^3$, the shoulders $m^2$ and $n^2$ will have come in contact and it will be impossible for the pin $m$ to approach any nearer the center line of link J. Before moving the steam-lever from $d$ to $d^4$ the stop-shoulders between the hub of the lever G and the hub $d^2$ are in contact, as shown by the single dotted line $q$ in Fig. 2, so that the hook F cannot move about the axis of the shaft $d^3$ in the direction indicated by the arrow 3 in Fig. 2, and the hook F does not rest upon the block $h$, but engages it only by the edge of the hardened-steel plate $i$, as clearly shown in Figs. 2 and 4. Movement of the hook F about its axis of vibration in the opposite direction is free, except that the hook is intended to be made of sufficient weight to counterbalance the weight of the lever G and links I and J and tend to keep the stop-surfaces between the lever G and hub $d^2$ always in contact. If the motion of the steam-lever be continued beyond $d^4$, the pin $m$ will be moved in an arc of a circle $m^5$ concentric to the center of the pin $o$, which causes a movement of the shaft $d^3$ about its axis sufficient to lift the hook F from engagement with the block $h$, thus releasing the valve-lever E and permitting the valve to be closed by the action of the dash-pot and cut off the steam. This cut-off in the case above described would occur, say, at seven-eighths stroke; but if now the governor should move the cam-collar about its bearing in the direction indicated by the arrow 4, so as to move the pin $o$, say, one-half inch and hold it in that position, the next admission of steam will be cut off considerably earlier in the stroke than in the first instance, and by varying the position of said pin $o$ to a greater or less extent in either direction the engine may be made to cut off at any desired point between the two extremes. The cubical or rectangular block $h$ is secured to the lever E so as to be changeable, in order to bring any desired corner thereof into position to be engaged by the plate $i$ of the hook F. This is done by means of the clamping-screw $h'$ and a steady-pin $h^2$, set in the lever E and adapted to interchangeably fit into either of the holes $h^3$, formed in the several sides of the block $h$, as shown in Fig. 7. The plate $i$ is in like manner secured to the hook-lever F by the screw $i^2$ and the steady-pin $i^3$, adapted to interchangeably fit either of the holes $i^4$, as shown in Fig. 8.

In the modification illustrated in Figs. 9 and 10 the cut-off collar H is dispensed with and the elbow-lever K is mounted upon a stud set in a boss formed on the bonnet C, one arm of said lever being connected to the governor-rod $l'$ and the other arm to the upper end of the rod L, the lower end of which is fitted to and movable endwise in a swiveling bearing M, mounted in a bearing in a boss projecting from the bonnet C, as shown. The links J are pivoted to the rod L by the pin $o$, and the links I and J are provided with the stops or shoulders $m^2$ and $n^2$, and said links are constructed substantially as in Figs. 2 and 3, except that in Figs. 2 and 3 the links I are double and connect to a single link J, while in Figs. 9 and 10 the upper links J are double and the lower link I single.

The operation of the device shown in Figs. 9 and 10 is substantially the same as described, except that the pin $o$ when moved by the action of the governor moves in very nearly a vertical right line instead of in a curved line concentric with the axis of the valve-stem.

What I claim as new, and desire to secure by Letters Patent of the United States, is—

1. In a valve-gear for operating an oscillating steam-admission valve, the combination of the two-armed lever D, mounted on and movable about a fixed journal concentric with the axis of the valve-stem, the elbow-lever E, firmly secured upon the valve-stem, the rectangular block or pin $h$, secured to one arm of said lever E, the pin $f$, set in the other arm of said lever and carrying the dash-pot rod $g$, the shaft $d^3$, mounted in a bearing in one end of the lever D, the hook F, secured to one end of said shaft and adapted to engage the block $h$, the lever G, secured to the opposite end of said shaft $d^3$, the governor-controlled pin $o$, the links I and J, provided with stops to limit the approach of the end of the lever G toward the center line of the link J, and any suitable means of imparting to said lever D a positive and determined vibration about the axis of the valve-stem.

2. The combination of the two-armed lever D, having journaled therein the shaft $d^3$, the hook-lever F, having set therein the rectangular hardened-steel plate $i$, the lever E, having changeably secured thereto the cubical or rectangular block $h$, the lever G, secured upon the shaft $d^3$, the governor-controlled pin $o$, and the links I and J, provided with stops to limit their movements toward positions parallel to each other.

3. The combination of the bonnet C, the valve-stem $b$, the levers D and E, the shaft $d^3$, the hook F, provided with the reversible plate $i$, the reversible or changeable block $h$, secured to the lever E, the lever G, the governor-controlled pin $o$, the links I and J, and the stops $m^2$ and $n^2$, all constructed, arranged, and adapted to operate substantially as and for the purposes described.

4. In combination with lever D, mounted loosely on a fixed journal concentric with the axis of the valve and carrying the hook F, the lever E, fixed on the valve-stem, the block $h$, provided with a central screw-hole in each side and a plurality of pin-receiving holes in each side, a steady-pin set in said lever to interchangeably fit either of said pin-holes in said block, and the clamping-screw for clamping said block to said lever.

5. In combination with the levers D and E, mounted, respectively, as set forth, the block $h$, carried by the lever E, the hook-lever F, carried by the lever D, the rectangular plate $i$, provided with a central screw-receiving hole and a plurality of pin-receiving holes equidistant from said central hole, a steady-pin set in the hook-lever F, and a screw to clamp said plate to said hook-lever, substantially as described.

6. The combination of the levers D and E, mounted as set forth and connected together by the hook F and block $h$, the lever G, the lever K, mounted upon a fixed bearing, the governor-rod $l'$, connected to one end of said lever, the rod L, pivoted at one end to the other arm of said lever K and having its other end mounted in a swiveling bearing M, the pin $o$, set in said rod L, the links I and J, connecting said pin $o$ and the lever G, and stops to limit the movements of said links toward positions parallel to each other.

In testimony whereof I have signed my name to this specification, in the presence of two subscribing witnesses, on this 13th day of July, A. D. 1891.

RICHARD H. RICE.

Witnesses:
 N. C. LOMBARD,
 WALTER E. LOMBARD.